US012542205B1

(12) United States Patent
Lipscher

(10) Patent No.: US 12,542,205 B1
(45) Date of Patent: Feb. 3, 2026

(54) METHOD AND SYSTEM FOR AI-BASED GENERATION OF THERAPEUTIC MEAL PLANS

(71) Applicant: Cox International LLC, Belize (BZ)

(72) Inventor: Randolph Lipscher, Austin, TX (US)

(73) Assignee: Cox International LLC, Belize (BZ)

( * ) Notice: Subject to any disclaimer, the term of this patent is extended or adjusted under 35 U.S.C. 154(b) by 0 days.

(21) Appl. No.: 19/202,824

(22) Filed: May 8, 2025

Related U.S. Application Data

(63) Continuation-in-part of application No. PCT/IB2025/052292, filed on Mar. 3, 2025, and a continuation-in-part of application No. PCT/IB2025/052293, filed on Mar. 3, 2025.

(51) Int. Cl.
*G16H 20/60* (2018.01)
*G06N 3/082* (2023.01)
*G16H 10/60* (2018.01)

(52) U.S. Cl.
CPC .............. *G16H 20/60* (2018.01); *G06N 3/082* (2013.01); *G16H 10/60* (2018.01)

(58) Field of Classification Search
CPC ......... G16H 20/60; G16H 10/60; G06N 3/082
See application file for complete search history.

(56) References Cited

U.S. PATENT DOCUMENTS

| 2010/0160740 A1* | 6/2010 | Cohen | A61B 5/4833 600/300 |
| 2020/0164209 A1* | 5/2020 | Hogg | A61N 1/0496 |
| 2022/0062621 A1* | 3/2022 | Hogg | A61N 1/36014 |
| 2022/0105282 A1* | 4/2022 | Helgeson | G16H 40/63 |
| 2022/0392609 A1* | 12/2022 | Hadad | G16H 20/60 |

\* cited by examiner

*Primary Examiner* — Brandon S Cole
(74) *Attorney, Agent, or Firm* — Michael D. Eisenberg; MDE Patents

(57) ABSTRACT

A system for real-time generation of therapeutic meal plans based on predictive analytics of patient profile data including a processor of a therapeutic plan server (TPS) node configured to host a machine learning (ML) module and connected to at least one patient-entity node over a network and a memory on which are stored machine-readable instructions that when executed by the processor, cause the processor to: receive patient profile data from the at least one patient-entity node; parse the patient profile data to derive a plurality of key classifying features; query a local database to retrieve local historical patients-related data based on the plurality of key classifying features; generate at least one classifier feature vector based on the plurality of key classifying features and the local historical patients-related data; provide the at least one feature vector to the ML module coupled to an Artificial Neural Network (ANN); receive a plurality of meal recommendation parameters from a meal plan predictive model generated by the ML module using outputs of the ANN based on the at least one feature vector; and generate a meal plan for the at least one patient-entity node based on the plurality of meal recommendation parameters.

15 Claims, 7 Drawing Sheets

300'

Ingest a sampled image frame from the sampled plurality of frames;
output a vector bounding box coordinates that enclose the patient profile; and
generate a confidence score indicating a likelihood of the patient profile having a sufficient coverage for generation of the meal plan for the at least one patient-entity node based on the vector bounding box coordinates — *317*

↓

Responsive to the confidence score being below a pre-set detection threshold, notify the at least one patient-entity node to request for additional video data related to the patient profile — *318*

↓

Retrieve remote historical patients-related data from at least one remote database based on the plurality of key classifying features, wherein the remote historical patients-related data is collected at other treatment cites or facilities of the same type — *319*

↓

Generate the at least one classifier feature vector based on the plurality of key classifying features and the local historical patients-related data combined with the remote historical patients-related data — *320*

↓

Continuously monitor the patient profile data to determine if at least one value of patient profile parameters deviates from a previous value of a patient profile parameter value by a margin exceeding a pre-set threshold value — *321*

↓

Responsive to the at least one value of the patient profile parameters deviating from the previous value of the patient profile parameter by the margin exceeding the pre-set threshold value, generate an updated classifier feature vector and generate the meal plan based on the at least one meal plan recommendation parameter produced by the meal plan predictive model in response to the updated classifier feature vector — *322*

↓

Record the meal plan and at least one corresponding meal plan recommendation parameter along with the patient profile data on a permissioned blockchain ledger — *323*

↓

Retrieve at least one meal plan recommendation parameter from the permissioned blockchain responsive to a request from at least one patient-entity node onboarded onto the permissioned blockchain — *324*

↓

Execute a smart contract to generate at least one NFT including data corresponding to the meal plan on the permissioned blockchain — *325*

↓

Compress the meal plan predictive model by pruning model's weights to remove the redundant ANN connections and confirm that the patient profile is complete based on a single digital image of the patient profile — *326*

↓

Retrain the pruned the meal plan predictive model to recover accuracy lost due to pruning — *327*

↓

Algorithmically generate a supplement formula comprising at least one key nutrient amount when the system fails to generate the meal plan based on the meal recommendation parameters — *328*

FIG. 3B

METHOD AND SYSTEM FOR AI-BASED GENERATION OF THERAPEUTIC MEAL PLANS

FIELD OF DISCLOSURE

The present disclosure generally relates to meal and medical treatment plan recommendations for patients, and more particularly, to an AI-based automated system and method for real-time generation of therapeutic meal plans based on predictive analytics of patient profile data.

BACKGROUND

Diet functions as a primary source of essential nutrients and plays a significant role in influencing human health and the progression of various diseases. In recent developments, dietary interventions have been identified as promising adjunct therapeutic strategies for a range of conditions including, but not limited to, cancer, neurodegenerative disorders, autoimmune diseases, cardiovascular conditions, and metabolic syndromes. Such interventions have exhibited notable potential in modulating metabolic processes, altering disease progression, and enhancing patient responses to therapeutic treatments.

Thus, creating therapeutic meal plans tailored to treat patient-specific medical conditions is potentially critical to disease modulation. While there are many authoritative sources that provide nutritional information and healthy recipes—such as the United States Department of Agriculture (USDA) through its website www.nutrition.gov—these sources typically do not offer meal plans intended for the treatment of specific health conditions.

Nevertheless, in certain cases, therapeutic meals that are rich in specific nutrients may play a significant role in managing, preventing, or treating health conditions. In such instances, having a prescription-like, authoritative recommendation for a therapeutic meal plan could be highly beneficial, assuming the recommendation is both reliable and scientifically accurate.

One of the challenges in developing therapeutic meal plans lies in the relationship between nutrients and specific medical conditions. While scientific studies provide the primary evidence for these connections, they are usually not tailored to an individual's unique genetic profile or diagnosis.

Health practitioners may recommend foods containing nutrients shown in studies to have a positive effect on certain conditions. However, medical research is often inconsistent, with conflicting findings across studies. Newer studies may either confirm or contradict earlier ones, providing additional insights that can influence dietary decisions. A major limitation is that practitioners may not always be aware of the latest or most comprehensive research, making it difficult to ensure that therapeutic meal plans are based on the best available evidence.

Evidence-based medicine (EBM) is an approach to medical practice that emphasizes the use of evidence from well-designed and conducted research to support proposed treatments to achieve clinical goals. Evidence based treatments are desirable for many reasons. First, they have been shown to lead to better outcomes, reduced morbidity and increased survival rates. Further, evidence for a proposed treatment is frequently a pre-requisite for reimbursement by an insurer.

There is a growing demand for the use of nutrients as pharmaceutical agents to treat various diseases. However, developing evidence-based, disease-specific, patient-specific therapies, wherein the pharmaceutical agents are nutrients, is a challenging task. The issue is not a lack of evidence. Numerous randomized controlled trials (RCTs) have investigated the relationship between specific nutrients and disease outcomes. For example, a recent study on Multiple Sclerosis (MS) found that administering 100,000 IU of Vitamin D every two weeks significantly reduced disease activity in patients with early-stage MS.

This particular study included 316 participants and was conducted over 24 months. It was also extremely costly, with estimated expenses ranging from $2 to $4 million. However, despite the value of such studies, their findings are often not optimized for individual patients. For instance, it is unlikely that the same Vitamin D dosage would be appropriate for both a 400-pound male weightlifter and a 98-pound female ballerina. Another limitation is that RCTs typically isolate one variable—such as a single nutrient—while ignoring the complex interplay of other factors, such as other nutrients, foods, supplements, medications, and lifestyle. In the context of MS, for example, a more individualized and effective approach might involve increasing Vitamin D intake to 100,000 IU units per day as well as increasing intake of quercetin (a flavonoid) to 20 mg per day, reducing daily protein intake by 10 grams, increasing Vitamin B6 to 30 mcg per day, and boosting Selenium intake to 50 mcg per day. These kinds of adjustments are not easily captured or tested in large-scale clinical trials.

Moreover, RCTs are often not feasible for exploring these nuanced relationships due to the enormous time and financial investment required. Even when results are available, they may not translate well to individual patients. Clinical trials are usually conducted on small and homogenous populations, which limits their applicability to the broader, more diverse patient population. For example, a study on the impact of green tea consumption on obesity reported that drinking one cup of green tea daily reduced the average BMI of participants by 2 kg over one year. However, all 30 participants were Asian women with BMIs between 25 and 30, living in Thailand. Applying these findings to an American population with average BMIs between 35 and 40 would be questionable at best.

Accordingly, much of the clinical research in nutrition is not only generalized but also fails to consider the individual's unique genetic background, disease complexity, and co-existing health conditions. For truly effective treatment strategies, personalized nutrition and integrative approaches must be prioritized. However, in practice it is impossible for a human practitioner to be aware of all relevant published studies involving a given nutrient. Additionally, there is no application that can automatically provide meal plan recommendations based not only on the studies, but using meal plan predictive models base on neural networks.

Accordingly, a system and method for AI-based real-time generation of therapeutic meal plans based on predictive analytics of patient profile data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for real-time generation of therapeutic meal plans based on predictive analytics of patient profile data including a processor of a therapeutic plan server (TPS) node configured to host a machine learning (ML) module and connected to at least one patient-entity node over a network and a memory on which are stored machine-readable instructions that when executed by the processor, cause the processor to: receive patient profile data from the at least one patient-entity node; parse the patient profile data to derive a plurality of key classifying features; query a local database to retrieve local historical patients-related data based on the plurality of key classifying features; generate at least one classifier feature vector based on the plurality of key classifying features and the local historical patients-related data; provide the at least one feature vector to the ML module coupled to an Artificial Neural Network (ANN); receive a plurality of meal recommendation parameters from a meal plan predictive model generated by the ML module using outputs of the ANN based on the at least one feature vector; and generate a meal plan for the at least one patient-entity node based on the plurality of meal recommendation parameters.

Another embodiment of the present disclosure provides a method executed by the TPS node that includes one or more of the steps: receiving patient profile data from the at least one patient-entity node; parsing the patient profile data to derive a plurality of key classifying features; querying a local database to retrieve local historical patients-related data based on the plurality of key classifying features; generating at least one classifier feature vector based on the plurality of key classifying features and the local historical patients-related data; providing the at least one feature vector to the ML module coupled to an Artificial Neural Network (ANN); receiving a plurality of meal recommendation parameters from a meal plan predictive model generated by the ML module using outputs of the ANN based on the at least one feature vector; and generating a meal plan for the at least one patient-entity node based on the plurality of meal recommendation parameters.

Another embodiment of the present disclosure provides a computer-readable medium including instructions for: receiving patient profile data from the at least one patient-entity node; parsing the patient profile data to derive a plurality of key classifying features; querying a local database to retrieve local historical patients-related data based on the plurality of key classifying features; generating at least one classifier feature vector based on the plurality of key classifying features and the local historical patients-related data; providing the at least one feature vector to the ML module coupled to an Artificial Neural Network (ANN); receiving a plurality of meal recommendation parameters from a meal plan predictive model generated by the ML module using outputs of the ANN based on the at least one feature vector; and generating a meal plan for the at least one patient-entity node based on the plurality of meal recommendation parameters.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 3B illustrates a further flowchart of a method for an AI-based automated real-time generation of therapeutic meal plans based on predictive analytics of patient profile data consistent with the present disclosure;

DETAILED DESCRIPTION

Figure 1A:
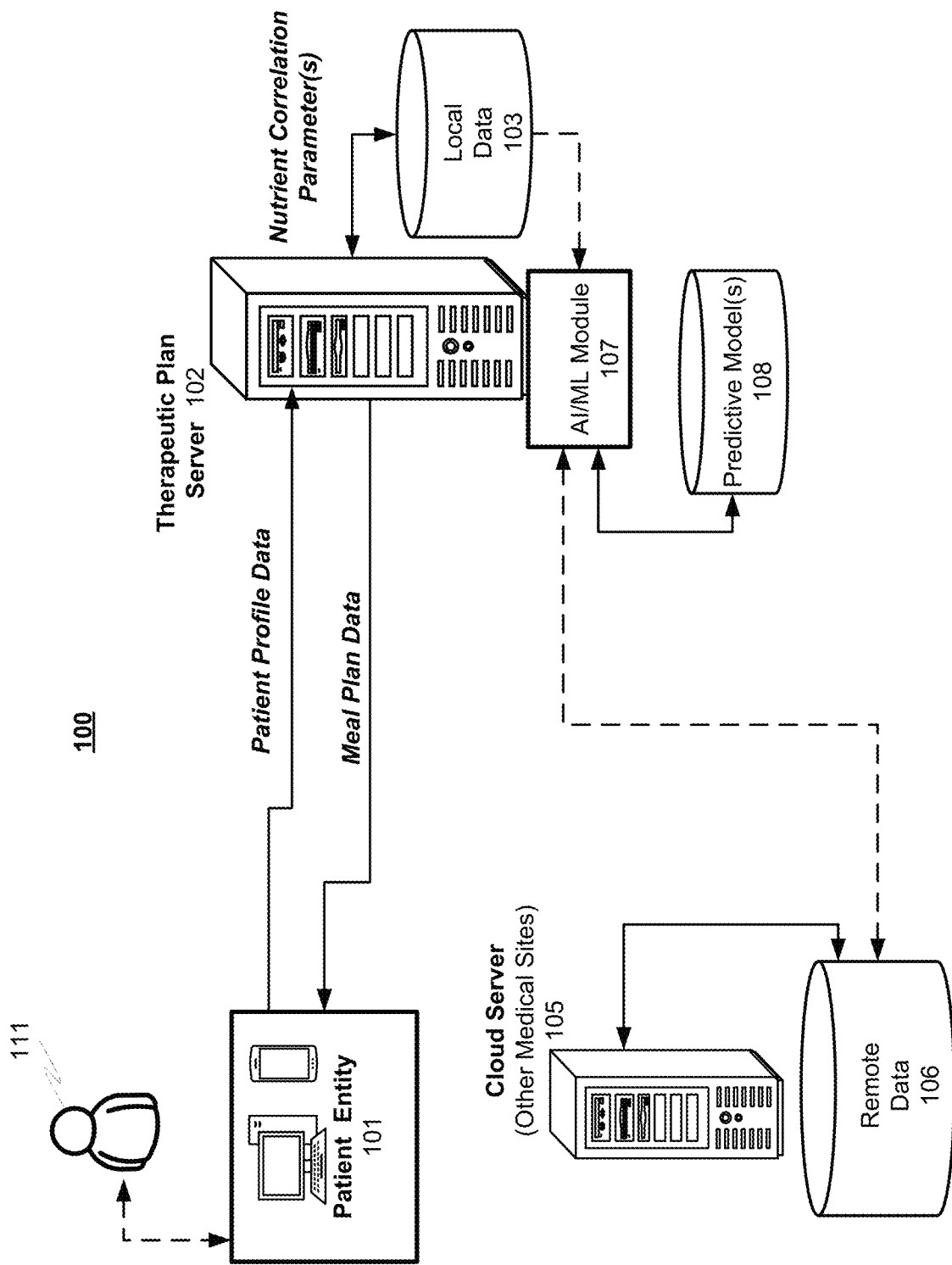
FIG. 1A illustrates a network diagram of a system for AI-based automated system and method for real-time generation of therapeutic meal plans based on predictive analytics of patient profile data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of meal plan recommendation parameter, embodiments of the present disclosure are not limited to use only in this context.

The following definitions may be used in the present disclosure.

"A classifier feature vector" refers to a mathematical representation of the key classifying features, typically in the form of an n-dimensional vector where each dimension corresponds to a specific feature. This vector is used as input for machine learning algorithms to categorize or analyze the patient profile data.

"A meal plan predictive model" refers to machine learning model trained on historical patient-related data to predict various outcomes or characteristics for meal plan generation. This model takes the feature vector as input and outputs predictions about a set of meal plan recommendation parameters.

"Pre-set threshold value" refers to a predetermined numerical value used as a decision boundary for triggering actions within the disclosed system. This value may be set based on historical data, expert knowledge, or specific data processing requirements.

The present disclosure provides a system, method and computer-readable medium for AI-based automated real-time generation of therapeutic meal plans based on predictive analytics of patient profile data. In one embodiment, the system overcomes the limitations of existing methods of meal plan provisioning by employing fine-tuned models to ingest and process the patient profile data, irrespective of data format, style, or data type. By leveraging the capabilities of the pre-trained predictive models, the disclosed approach offers a significant improvement over existing solutions discussed above in the background section.

In one embodiment imagery or video user profile data may be used. In this embodiment, data augmentation (only for the Model Training Phase) may be performed as follows. To further improve the model's generalization—the ability to make accurate predictions under various imaging conditions—data augmentation will be applied to the images. Two types of data augmentation may be used: morphological transformations and color transformations. Morphological transformations focus on changing the shape or orientation of the image, including random rotation, random scaling, flipping, and random cropping. Color transformations focus on changing the color of the image to simulate different lighting conditions, including adjustments to brightness, contrast, saturation, and hue.

Image Stitching Algorithm may be implemented as follows. The first part of the image stitching algorithm calculates the homography matrix between two consecutive frames based on feature points detected by the ORB (Oriented FAST and Rotated BRIEF) algorithm. The homography matrix is then used to warp the second frame to align with the first frame. The algorithm continues to calculate the homography matrix between the warped second frame and the third frame, and so on, until all frames are stitched together. With the stitched image, the second part of the algorithm compares it with a predefined reference image to determine if the patient medical imagery data is well covered. In one embodiment, the comparison may be based on a Siamese neural network that calculates the similarity between the stitched image and the reference image.

As discussed above, in one embodiment of the present disclosure, the system provides for an AI and machine learning (ML)-generated therapeutic meal plan predictive model based on analysis of patient profile data. In one embodiment, the meal plan predictive model may be generated to provide for the meal plan recommendation parameter(s) associated with the patient being analyzed. The automated therapeutic meal plan predictive model may use historical patients-related data collected at the current medical facility location (or site) and at medical facilities of the same type located within a certain range from the current location or even located globally. The relevant historical patients-related data may include data related to other patients having the same parameters such as height, weight, gender, race, geographic locations, diagnosis, etc. The relevant patients-related data may indicate successfully implemented meal plans based on predictive analytics and associated successful medical treatment.

In one embodiment, to enhance this process, the system may integrate advanced technologies discussed above, such as Artificial Intelligence (AI) and machine-learning (ML) and Blockchain. The AI may be leveraged for several key functions discussed herein.

Additionally, the disclosed therapeutic meal plan-based medical system may incorporate Blockchain technology to ensure the transparency and immutability of transactions, providing a secure and trustworthy platform. By embedding these advanced technologies, the disclosed automated system, advantageously, offers a sophisticated and secure solution.

As discussed above, in one disclosed embodiment, the AI/ML technology may be combined with a blockchain technology for secure use of the patient-related data and meal plans data. In one embodiment, the ML module may use the meal plan predictive model(s) that use an artificial neural network (ANN), a non-linear modeling approach to extract quantitative features from the patient profile data to generate predictive meal plan recommendation parameters. The use of specially trained ANNs provides a number of improvements over traditional methods of analyzing of data received from the patient being analyzed, including more accurate prediction of patient-related meal plan verdicts to be generated in the future. The application further provides methods for training the ANN that leads to a more accurate use of the meal plan predictive model(s).

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network that has an input layer, an output layer, attention-mechanism blocks, convolutional blocks, residual blocks, and several fully connected hidden layers. The proposed ANN may be particularly useful for patient meal plan predictive model generation because the ANN can effectively extract features from the patient profile data in linear and non-linear relationships. In some embodiments, the proposed ANN may be implemented by an application-specific integrated circuit (ASIC). The ASICs may be specially designed and configured for a specific AI application and provide superior computing capabilities and reduced electricity and computational resources consumption compared to the traditional CPUs.

Accordingly, the disclosed embodiments provide a dynamic, closed-loop system for generating, evaluating, and continuously optimizing dietary plans through a cyclical feedback mechanism involving genetic algorithms and neural networks informed by comprehensive patient data.

As patients follow these dietary plans, their real-world health, lifestyle, and behavioral data—including medications, vital signs, disease progression, physical activity, mental health, and more—are continuously monitored. The actual dietary intake and patient data are structured into a time-series dataset and fed into a neural network, which learns complex interactions between nutrient patterns and outcomes. Critically, the neural network not only predicts improved micronutrient and macronutrient levels associated with better outcomes (e.g., reduced disease incidence, slower disease progression, improved lab values) but also factors in medication interactions, exercise levels, sleep, emotional health, and other modifiable parameters.

These refined nutrient recommendations are then cycled back into the meal plan generation algorithm, which generates a new meal plan that reflects both empirical findings and individualized optimizations. This cycle continues iteratively, making the system self-adaptive and continually aligned with the patient's evolving needs and biological responses detected via on body sensors, lab test, video and imagery data.

The data acquired from a patient may include active and historical medications; medical history and diagnoses; disease staging and progression; lab values, vitals, and biometric trends; genetic or recombinant risk factors; exercise levels, sleep patterns, and physical activity; emotional and psychological health indicators; lifestyle, behavioral preferences, dietary restrictions; and EMR data including imaging, clinical notes, and lab trajectories.

In one embodiment, initially, the Genetic Algorithm may be used to, using nutritional guidelines drawn from peer-reviewed medical literature and curated by nutritionists, create a baseline meal plan targeting nutrient range correlated with health improvement and disease prevention.

Patient real-time monitoring may include real-time data captured from:
Food logs or tracking devices;
EMR integrations for medical/lab updates;
Fitness wearables for exercise data;
Emotional health assessments; and
Medication updates or adherence tracking.

FIG. 1A illustrates a network diagram of a system for AI-based automated system and method for real-time generation of therapeutic meal plans based on predictive analytics of patient profile data consistent with the present disclosure.

Referring to FIG. 1A, the example network 100 includes the Therapeutic Plan Server (TPS) node 102 connected to a cloud server node(s) 105 over a network. The TPS node 102 is configured to host an AI/ML module 107 coupled to the ANN (shown in FIG. 4). The TPS node 102 may receive patient profile data (including imagery and video data) from the patient-entity node 101 associated with the patient 111.

The TPS node 102 may query a patient database 103 for the historical local patient-related data based on the patient profile data associated with the current patient entity 101 node. The TPS node 102 may acquire relevant remote patient-related data from a remote database 106 residing on the cloud server 105. The patient-related data in the database 106 may be collected from other patients at different patient/medical sites or facilities. The remote patients' data may be collected from the patients of the same (or similar) type, race, gender, location, weight and height, activity level, medications, diagnosis etc. as the local patient 111 based on the patient 111 profile. The patient 111 profile data may be based on Electronic Medical Records (EMR) data.

The EMR data may include, for example, medications, diagnoses, weight/BMI, blood pressure, lab results (e.g., HgbA1c), family history, depression score, etc. In addition to the EMR data, the patient profile data may be combined with or include radio graphic data, external medical data (e.g., prescriptions, lab results, etc.) and data from body sensors. In one embodiment, the patient 101 can be rendered an initial meal plan based on the initial basic patient parameters (e.g., weight, activity level, medications) based on known scientific data processed through a genetic algorithm. However, the initial meal plan is updated once the meal plan predictive model(s) 108 is generated and the meal plan recommendation parameters are produced by the meal plan predictive model(s) 108. In one embodiment the meal plan predictive model(s) 108 may generate nutrient correlation parameters indicating a correlation between nutrients found in food items with treatment of the patients' conditions. However, the meal plan recommendations parameters may be generated based on the nutrient correlation parameters.

The TPS node 102 may generate a feature vector or classifier data based on the patient 111 profile data and the collected heuristics data (i.e., pre-stored local data 103 and remote data 106). The TPS node 102 may ingest the feature vector/classifier data into an AI/ML module 107. The AI/ML module 107 may generate a meal plan predictive model(s) 108 based on the feature vector/classifier data to generate meal plan (or medical treatment) recommendation parameters for automatic generation of the patient meal plan for rendering to the patient-entity node 101 associated with the patient 111. The meal plan (or medical treatment) parameters may be further analyzed by the TPS node 102 prior to the generation of the patient meal plan to be rendered to the patient 111. Once the patient profile data is recorded over time, the entire or partial data may be analyzed to generate a feedback report by the AI/ML module 107 based on the outputs of the meal plan predictive model(s) 108. The feedback report may indicate effectiveness of implementation of the meal plan for the patient 111.

In one embodiment, the meal plan predictive model may be employed to generate medical recommendations along with the food-related recommendations. For example, a 300 lb Patient with type 2 diabetes, and a BMI of 37, and A HA1C of 10 currently taking the medication Metformin (1000 mg twice a day) is placed on a diabetes and obesity meal plan based on the current patient profile data and the heuristics data of other similar patients. After 4 weeks on the recommended meal plan, the patient's daily blood sugar (as measured by the blood glucometer) drops from an average of 140 to 115. At this point the recommendations generated by the TPS node 102 may include advices to the patient to decrease the intake of Metformin to 500 mg twice a day. In one embodiment, the notification may automatically be pushed to a physician node onboarded onto the network (not shown).

As another example, after 6 months the above patient has lost 25 pounds. The patient's BMI is now 33. His average daily blood glucose has decrease to 100. The TPS node 102 may now send the patient's physician node a message recommending removing the Metformin in order to protect the patient against hypoglycemia.

As yet another example, a patient is a 35-year-old white female with a history of depression. She takes 10 mg of Prozac daily for her depression. Over the past month the patient's depression appears to have worsened. She has increasing difficulty sleeping, and has lost about 15 pounds. She also has been feeling hopeless and alone. This data is reflected in the patient's profile being monitored by the TPS node 102 remotely. TPS node 102 may process the parameters from the meal plan model and may generate a plan including recommendations for increasing her daily exercise from 1 mile to 1.5 miles of walking per day. The meal plan may indicate amount of chocolate intake to be increased as well as foods that contain Vitamin D, B6 and B12. The generated meal plan may include increases her calcium, potassium and Quercetin intake. In this example, although calcium, potassium and quercetin intake have never been reported in the scientific literature to affect depression, the meal plan predictive model may have identified an association between depression and these nutrients based on heuristics of other similar patients. The recommendations may suggest patient to go the movies once a week, and begin attending church services (or implementing other behavioral changes). In one embodiment, patient's psychiatrist node on-boarded on the network may receive a recommendation to increase her Prozac intake to 20 mg per day, or a change to Wellbutrin.

In yet another example, a 30-year-old Caucasian female patient has been recently diagnosed with Multiple Sclerosis (MS). In response, the patient has been placed on a therapeutic dietary protocol optimized through a neural network-based system, designed to modulate disease progression and support neurological health. The prescribed nutritional regimen includes the following daily intake specifications:

Vitamin D: 1000 mg
Quercetin (flavonoid): 20 mg
Protein (restricted intake): 20 g
Vitamin B6: 30 mcg
Selenium: 50 mcg
Sulforaphane: 50 mg Due to the practical limitations associated with achieving these nutrient targets through dietary sources alone, the system algorithmically generates an alternative supplement-based meal plan delivery approach. As a result, the patient is offered a custom-formulated supplement-based meal plan containing:

Vitamin D: 1000 mg
Sulforaphane: 30 mg
Selenium: 50 mg

This formulation ensures baseline therapeutic coverage for key nutrients while addressing dietary compliance challenges. The revised supplement regimen represents a system-driven adjustment intended to maintain treatment efficacy when food-based nutrient integration is suboptimal.

Exchanges of patient's confidential and private information may be implemented over a permissioned block chain network for security and anonymity as discussed in more details below.

Figure 1B:
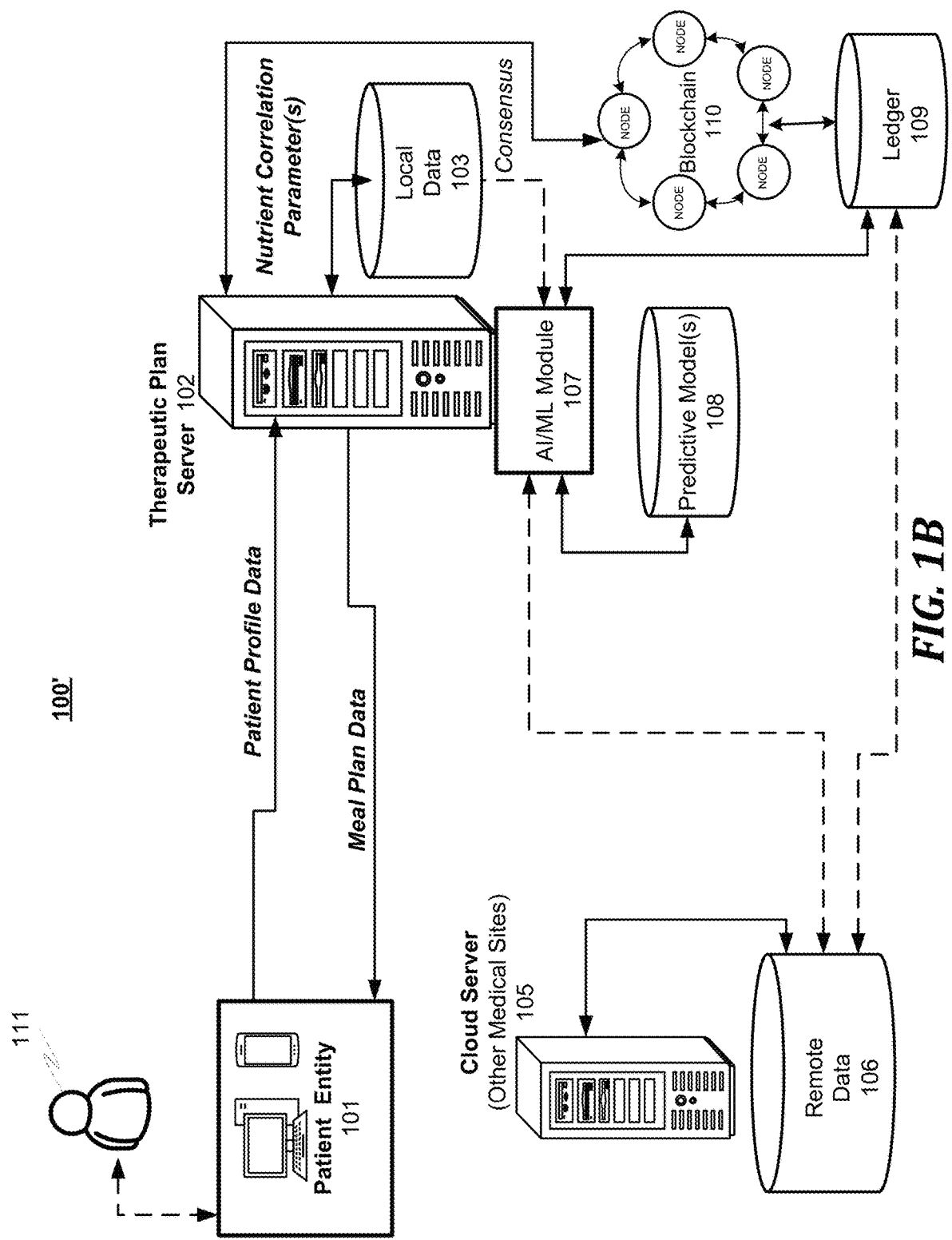
FIG. 1B illustrates a network diagram of a system for AI-based automated system and method for real-time generation of therapeutic meal plans based on predictive analytics of patient profile data implemented over a blockchain network consistent with the present disclosure.

FIG. 1B illustrates a network diagram of a system for AI-based automated system and method for real-time generation of therapeutic meal plans based on predictive analytics of patient profile data implemented over a blockchain network consistent with the present disclosure.

Referring to FIG. 1B, the example network 100' includes the Therapeutic Plan Server (TPS) node 102 connected to a cloud server node(s) 105 over a network. The TPS node 102 is configured to host an AI/ML module 107 coupled to the ANN (shown in FIG. 4). The TPS node 102 may receive patient profile data (including imagery and video data) from the patient-entity node 101 associated with the patient 111.

The TPS node 102 may query a patient database 103 for the historical local patient-related data based on the patient profile data associated with the current patient entity 101 node. The TPS node 102 may acquire relevant remote patient-related data from a remote database 106 residing on the cloud server 105. The patient-related data in the database 106 may be collected from other patients at different patient facilities. The remote patient data may be collected from the patients of the same (or similar) type, race, gender, location, weight and height, activity level, medications, diagnosis etc. as the local patient 111 based on the patient 111 profile. The patient 111 profile data may be based on Electronic Medical Records (EMR) data.

The EMR data may include, for example, medications, diagnoses, weight/BMI, blood pressure, lab results (e.g., HgbA1c), family history, depression score, etc. In addition to the EMR data, the patient profile data may be combined with or include radio graphic data, external medical data (e.g., prescriptions, lab results, etc.) and data from body sensors. In one embodiment, the patient 101 can be rendered an initial meal plan based on the initial basic patient parameters (e.g., weight, activity level, medications) based know genetic scientific data processed through a genetic algorithm. However, the initial meal plan is updated once the meal plan predictive model(s) 108 is generated and the meal plan recommendation parameters are produced by the meal plan predictive model(s) 108. In one embodiment the meal plan predictive model(s) 108 may generate nutrient correlation parameters indicating a correlation between nutrients found in food items with treatment of the patients' conditions. However, the meal plan recommendations parameters may be generated based on the nutrient correlation parameters.

The TPS node 102 may generate a feature vector or classifier data based on the patient 111 profile data and the collected heuristics data (i.e., pre-stored local data 103 and remote data 106). The TPS node 102 may ingest the feature vector/classifier data into an AI/ML module 107. The AI/ML module 107 may generate a meal plan predictive model(s) 108 based on the feature vector/classifier data to generate meal plan (or medical treatment) recommendation parameters for automatic generation of the patient meal plan for rendering to the patient-entity node 101 associated with the patient 111. The meal plan (or medical treatment) parameters may be further analyzed by the TPS node 102 prior to the generation of the patient meal plan to be rendered to the patient 111. Once the patient profile data is recorded over time, the entire or partial data may be analyzed to generate a feedback report by the AI/ML module 107 based on the outputs of the meal plan predictive model(s) 108. The feedback report may indicate effectiveness of implementation of the meal plan for the patient 111.

In one embodiment, the TPS node 102 may receive the meal plan recommendation parameters from a permissioned blockchain 110 ledger 109 based on a consensus from the patient node(s) 101. Additionally, confidential historical patient-related information and previous patient-related metrics data may also be acquired from the permissioned blockchain 110. The newly acquired patient-related data with corresponding predicted meal plan recommendation parameters data may be also recorded on the ledger 109 of the blockchain 110 so it can be used as training data for the predictive meal plan model(s) 108.

In this implementation the TPS node 102, the cloud server 105, the patient entity nodes 101 may serve as blockchain 110 peer nodes. In one embodiment, local data from the database 103 and remote data from the database 106 may be duplicated on the blockchain ledger 109 for higher security of storage.

The AI/ML module 107 may generate the meal plan predictive model(s) 108 to predict the meal plan recommendation parameters in response to the specific relevant pre-stored patient-related data acquired from the blockchain 110 ledger 109. This way, the current meal plan recommendation parameters may be predicted based not only on the current patient entity 101-related data (including live sensory data), but also based on the previously collected heuristics. This way, the most optimal way of nutrient-based treatment of the patient associated with the patient 111 may be included into the feedback report. After the data processing and the feedback report generation is completed, the related documents may be converted into unique secure NFT assets to be recorded on the blockchain to be used for future predictive models' training.

In one embodiment, as a second round of approval, a blockchain consensus may be achieved among the patient entities 101 and doctor entities (not shown) in order to approve the feedback report and/or treatment recommendations generated by the TPS node 102.

Figure 2:
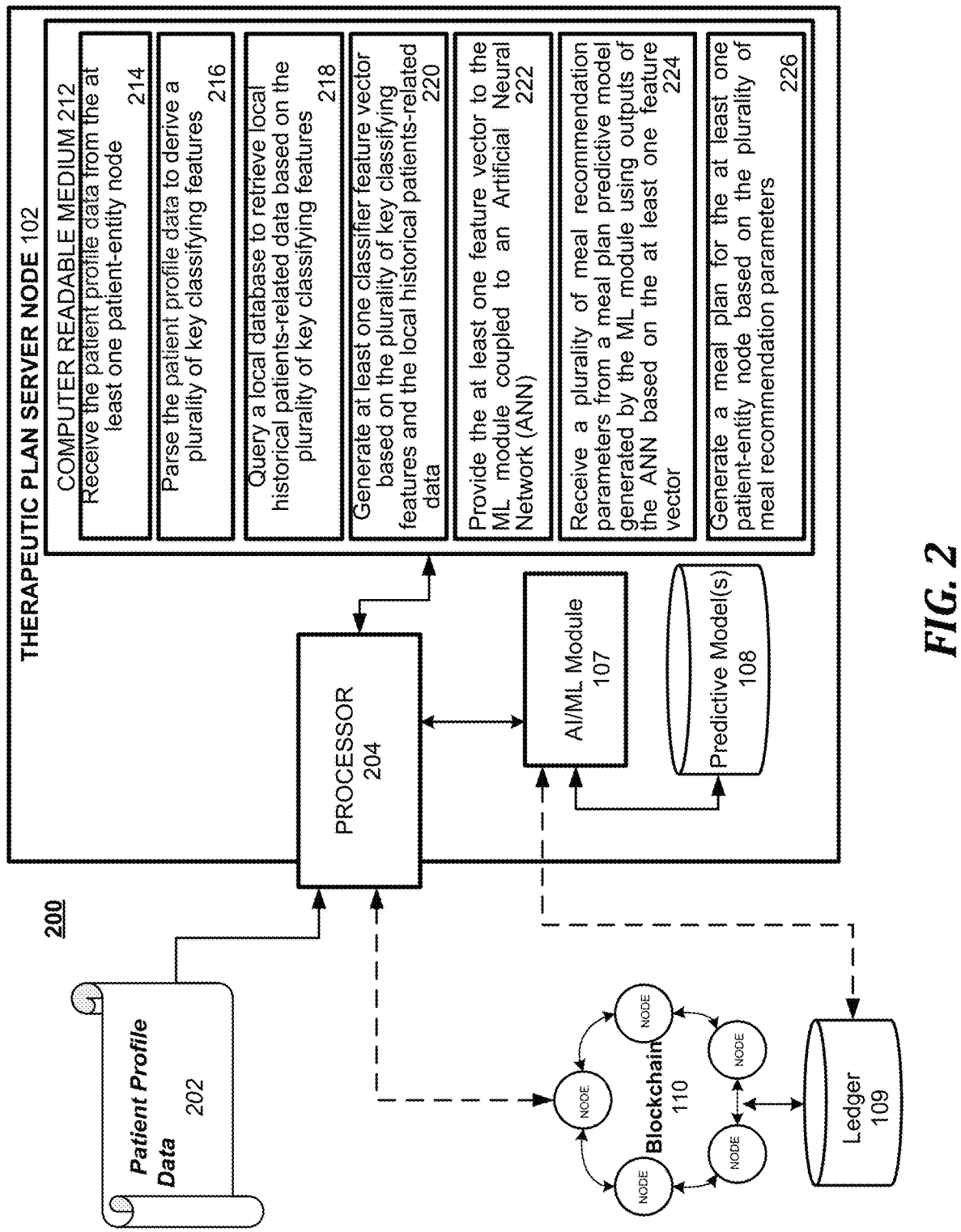
FIG. 2 illustrates a network diagram of a system including detailed features of a Therapeutic Plan Server (TPS) node consistent with the present disclosure.

FIG. 2 illustrates a network diagram of a system including detailed features of a Therapeutic Plan Server (TPS) node consistent with the present disclosure.

Referring to FIG. 2, the example network 200 includes the TPS node 102 connected to the patient entity node 101 (see FIGS. 1A-B) to receive the patient profile data 202 including EMR data.

The TPS node 102 is configured to host an AI/ML module 107. As discussed above with respect to FIGS. 1A-B, the TPS node 102 may receive the patient profile data 202 and pre-stored patients-related data retrieved from the local and remote databases. As discussed above, the pre-stored patients-related data may be retrieved from the ledger 109 of the permissioned blockchain 110.

The AI/ML module 107 may generate a predictive meal plan model(s) 108 based on the received patient profile data 202 provided by the TPS node 102. As discussed above, the AI/ML module 107 may provide predictive outputs data in the form of meal plan recommendation parameters for automatic generation of the patient meal plan. In one embodiment, the TPS node 102 may process the predictive outputs data received from the AI/ML module 107 to generate or update meal plan recommendations.

In one embodiment, the TPS node 102 may continually monitor the patient profile data 202 (including sensory data) and may detect a parameter that deviates from a previous recorded parameter (or from a median reading value) by a margin that exceeds a threshold value pre-set for this particular parameter. For example, if the patient profile metrics change significantly, this may cause a change in the meal plan recommendation parameters currently used in the meal plan of the patient. Accordingly, once the threshold is met or exceeded by at least one parameter of the patient-related data, the TPS node 102 may provide the currently acquired patient-related parameter to the AI/ML module 107 to generate an updated meal plan recommendation parameter(s) based on the patient 111-related data.

While this example describes in detail only one TPS node 102, multiple such nodes may be connected to the network and to the blockchain 110. It should be understood that the TPS node 102 may include additional components and that some of the components described herein may be removed and/or modified without departing from a scope of the TPS node 102 disclosed herein. The TPS node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the TPS node 102 may include multiple processors, multiple cores, or the like, without departing from the scope of the TPS node 102 system.

The TPS node 102 may also include a non-transitory computer readable medium 212 that may have stored thereon machine-readable instructions executable by the processor 204. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to receive the patient 111 profile data from the at least one patient-entity node 101 (FIG. 1A-B). The processor 204 may fetch, decode, and execute the machine-readable instructions 216 to parse the patient profile data to derive a plurality of key classifying features. The processor 204 may fetch, decode, and execute the machine-readable instructions 218 to query a local database 103 to retrieve local historical patients-related data based on the plurality of key classifying features. The processor 204 may fetch, decode, and execute the machine-readable 220 to generate at least one classifier feature vector based on the plurality of key classifying features and the local historical patients-related data.

The processor 204 may fetch, decode, and execute the machine-readable instructions 222 to provide the at least one feature vector to the ML module 107 coupled to an Artificial Neural Network (ANN). The processor 204 may fetch, decode, and execute the machine-readable instructions 224 to receive a plurality of meal recommendation parameters from a meal plan predictive model generated by the ML module using outputs of the ANN based on the at least one feature vector. The processor 204 may fetch, decode, and execute the machine-readable instructions 226 to generate a meal plan for the at least one patient-entity node 101 based on the plurality of meal recommendation parameters.

As a non-limiting example, the consensual approval of the meal plan may be associated with a request for additional data such as an additional blood tests, imagery, etc. The permissioned blockchain 110 may be configured to use one or more smart contracts that manage transactions for multiple participating nodes and for recording the transactions on the ledger 109.

Figure 3A:
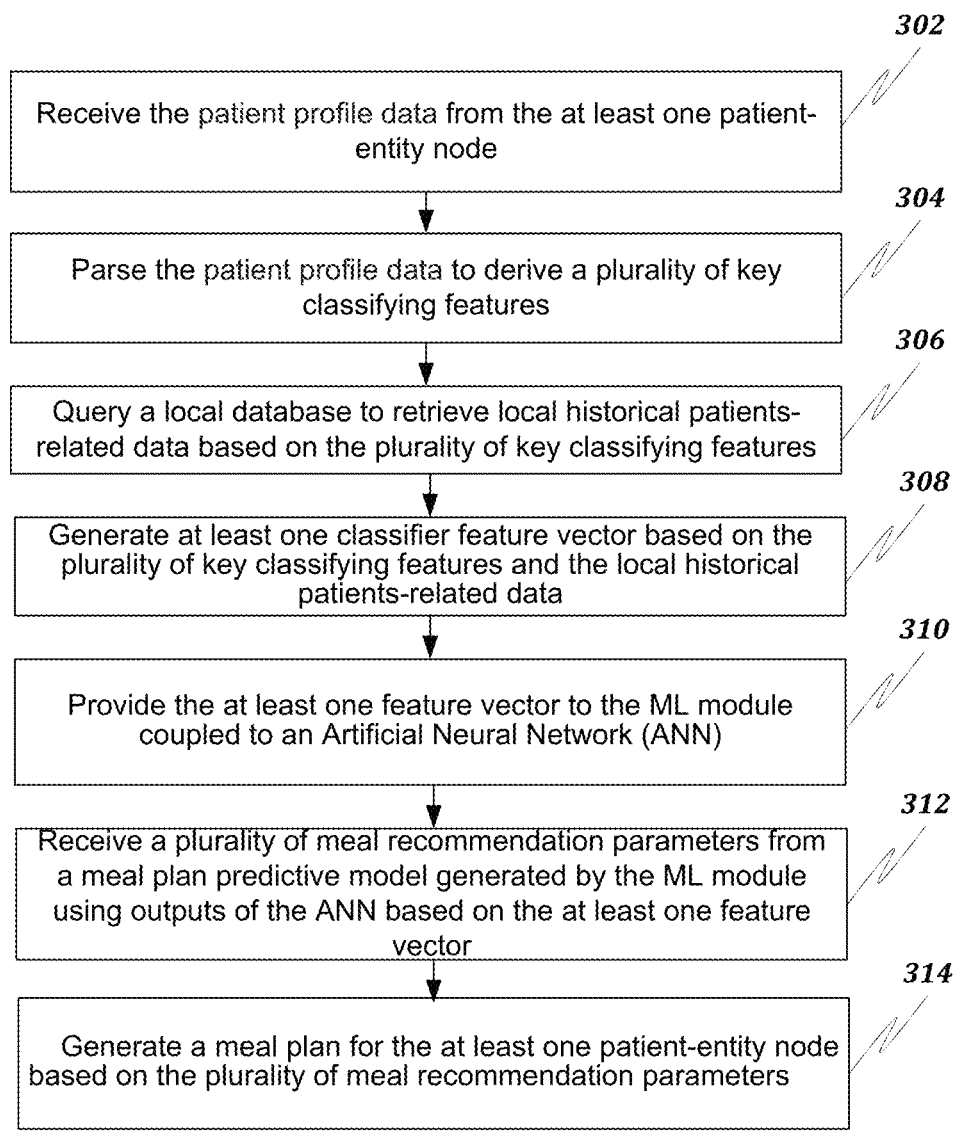
FIG. 3A illustrates a flowchart of a method for an AI-based automated real-time generation of therapeutic meal plans based on predictive analytics of patient profile data consistent with the present disclosure.

FIG. 3A illustrates a flowchart of a method for an AI-based automated real-time generation of therapeutic meal plans based on predictive analytics of patient profile data consistent with the present disclosure.

Referring to FIG. 3A, the method 300 may include one or more of the steps described below. FIG. 3A illustrates a flow chart of an example method executed by the TPS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the TPS node 102 may execute some or all of the operations included in the method 300.

With reference to FIG. 3A, at block 302, the processor 204 may receive the patient profile data from the at least one patient-entity node. At block 304, the processor 204 may parse the patient profile data to derive a plurality of key classifying features. At block 306, the processor 204 may query a local database to retrieve local historical patients-related data based on the plurality of key classifying features. At block 308, the processor 204 generate at least one classifier feature vector based on the plurality of key classifying features and the local historical patients-related data. At block 310, the processor 204 may provide the at least one feature vector to the ML module coupled to an Artificial Neural Network (ANN). At block 312, the processor 204 may receive a plurality of meal recommendation parameters from a meal plan predictive model generated by the ML module using outputs of the ANN based on the at least one feature vector. At block 314, the processor 204 may generate a meal plan for the at least one patient-entity node based on the plurality of meal recommendation parameters.

FIG. 3B illustrates a further flowchart of a method for an AI-based automated real-time generation of therapeutic meal plans based on predictive analytics of patient profile data consistent with the present disclosure.

Referring to FIG. 3B, the method 300' may include one or more of the steps described below. FIG. 3B illustrates a flow chart of an example method executed by the TPS node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the TPS 102 may execute some or all of the operations included in the method 300'.

With reference to FIG. 3B, at block 317, the processor 204 may ingest a sampled image frame from the sampled plurality of frames; output a vector bounding box coordinates that enclose the patient profile; and generate a confidence score indicating a likelihood of the patient profile having a sufficient coverage for generation of the meal plan for the at least one patient-entity node based on the vector bounding box coordinates.

At block 318, the processor 204 may responsive to the confidence score being below a pre-set detection threshold, notify the at least one patient-entity node to request for additional video data related to the patient profile. At block 319, the processor 204 may retrieve remote historical patients-related data from at least one remote database based on the plurality of key classifying features, wherein the remote historical patients-related data is collected at other treatment sites or facilities of the same type. At block 320, the processor 204 may generate the at least one classifier feature vector based on the plurality of key classifying features and the local historical patients-related data combined with the remote historical patients-related data. At block 321, the processor 204 may continuously monitor the patient profile data to determine if at least one value of patient profile parameters deviates from a previous value of a patient profile parameter value by a margin exceeding a pre-set threshold value.

At block 322, the processor 204 may responsive to the at least one value of the patient profile parameters deviating from the previous value of the patient profile parameter by the margin exceeding the pre-set threshold value, generate an updated classifier feature vector and generate the meal plan based on the at least one meal plan recommendation parameter produced by the meal plan predictive model in response to the updated classifier feature vector. At block 323, the processor 204 may record the meal plan and at least one corresponding meal plan recommendation parameter along with the patient profile data on a permissioned blockchain ledger.

At block 324, the processor 204 may retrieve at least one meal plan recommendation parameter from the permissioned blockchain responsive to a request from at least one patient-entity node onboarded onto the permissioned blockchain.

At block 325, the processor 204 may execute a smart contract to generate at least one NFT including data corresponding to the meal plan on the permissioned blockchain. At block 326, the processor 204 may compress the meal plan predictive model by pruning model's weights to remove the redundant ANN connections and may confirm that the patient profile is complete based on a single digital image of the patient profile. At block 327, the processor 204 may retrain the pruned the meal plan predictive model to recover accuracy lost due to pruning. At block 328, the processor 204 may algorithmically generate a supplement formula comprising at least one key nutrient amount when the system fails to generate the meal plan based on the meal recommendation parameters.

The meal plan parameters used in training data sets may be stored in a centralized local database (such as one used for storing local data 103 depicted in FIGS. 1A-B). In one embodiment, an ANNN may be used in the AI/ML module 107 for the meal plan parameters' modeling and meal plan generation.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 105 and 102 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing recommendation parameters, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

Figure 4:
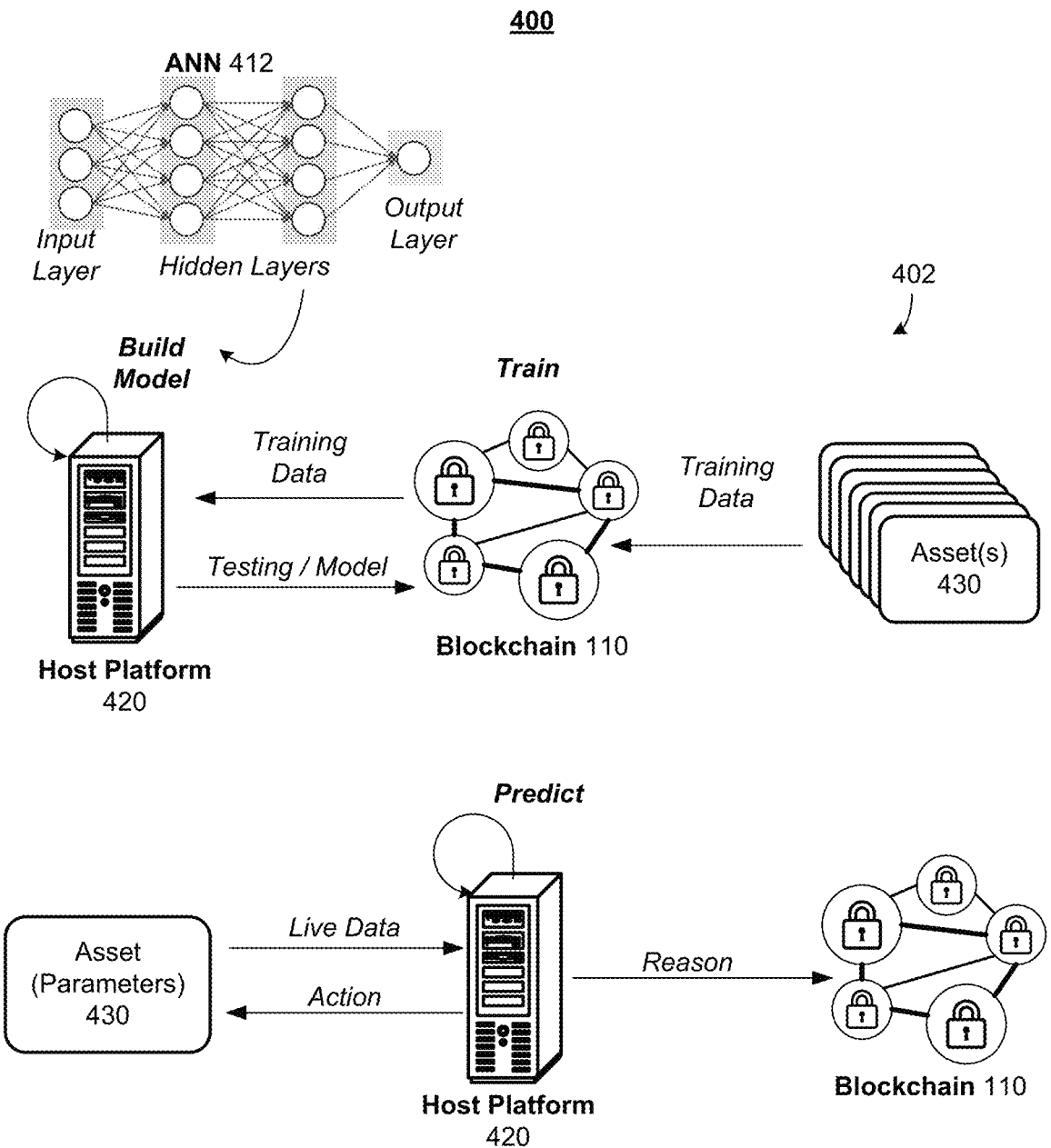
FIG. 4 illustrates deployment of a machine learning model for prediction of meal plan recommendation parameters using blockchain assets consistent with the present disclosure.

In the example depicted in FIG. 4, a host platform 420 (such as the TPS node 102) builds and deploys a machine learning model for predictive monitoring of assets 430. Here, the host platform 420 may be a cloud platform, an industrial server, a web server, a personal computer, a user device, and the like. Assets 430 can represent meal plan recommendation parameters. The blockchain 110 can be used to significantly improve both a training process 402 of the machine learning model and the meal plan recommendation parameters' predictive process 405 based on a trained machine learning model that uses outputs of the ANN 412. For example, in 402, rather than requiring a data scientist/engineer or other user to collect the data, historical data (heuristics—i.e., patient-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the TPS node 102 or from the databases 103 and 106 depicted in FIGS. 1A-1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This, advantageously, provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make recommendation-related predictions/decisions based on the execution of the final trained machine learning model using the prediction parameters. In this example, data fed back from the asset 430 may be input into the machine learning model and may be used to make event predictions such as meal plan recommendation parameters based on the recorded patient-related data. Determinations made by the execution of the machine learning model (e.g., approval of meal plans, etc.) at the host platform 420 may be stored on the blockchain 110 to provide auditable/verifiable proof. As one non-limiting example, the machine learning model may predict a future change of a part of the asset 430 (the meal plan recommendation parameters). The data behind this decision may be stored by the host platform 420 on the blockchain 110.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
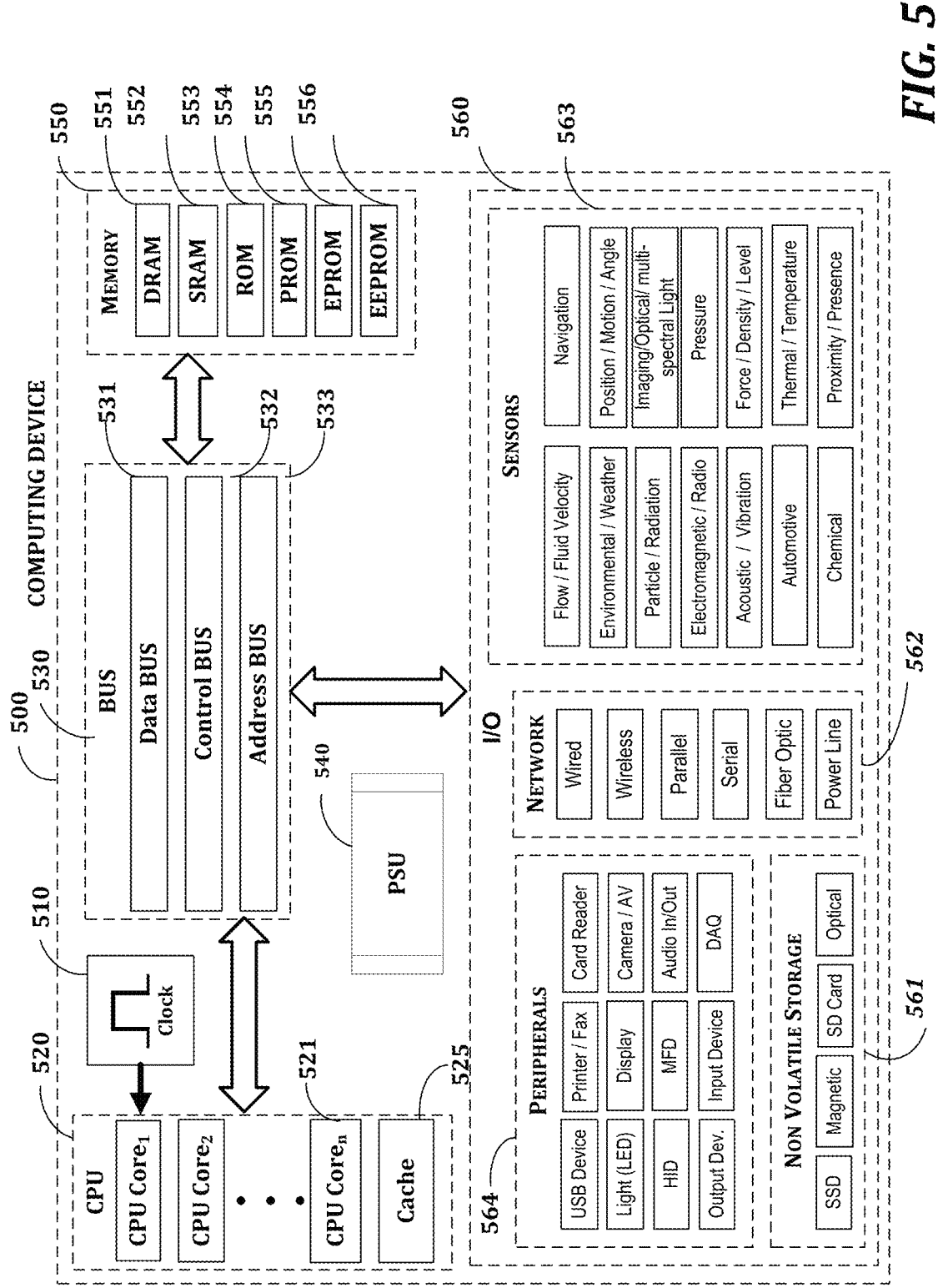
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The TPS node 102 (see FIG. 2) may be hosted on a centralized server or on a cloud computing service. Although method 300 has been described to be performed by the TPS node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the TPS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:
Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (TPS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:
  Wired communications, such as, but not limited to, coaxial cable, phone lines, twisted pair cables (ethernet), and InfiniBand.
  Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 5G (such as WiMax and LTE), and 5G (short and long wavelength).
  Parallel communications, such as, but not limited to, LPT ports.
  Serial communications, such as, but not limited to, RS-232 and USB.
  Fiber Optic communications, such as, but not limited to, Single-mode optical fiber (SMF) and Multi-mode optical fiber (MMF).
  Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical TPS sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust TPS/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.
  Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
  Environmental, weather, moisture, and humidity sensors, such as, but not limited to, actinometer, air pollution sensor, bedwetting alarm, ceilometer, dew warning, electrochemical TPS sensor, fish counter, frequency domain sensor, TPS detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, TPS meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LIDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust TPS temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for real-time generation of therapeutic meal plans based on predictive analytics of patient profile data, comprising:
    a processor of a therapeutic plan server (TPS) node configured to host a machine learning (ML) module and connected to at least one patient-entity node over a network; and
    a memory on which are stored machine-readable instructions that when executed by the processor, cause the processor to:
        receive the patient profile data from the at least one patient-entity node;
        parse the patient profile data to derive a plurality of key classifying features;
        query a local database to retrieve local historical patients-related data based on the plurality of key classifying features;
        generate at least one classifier feature vector based on the plurality of key classifying features and the local historical patients-related data;
        provide the at least one feature vector to the ML module coupled to an Artificial Neural Network (ANN);
        receive a plurality of meal recommendation parameters from a meal plan predictive model generated by the ML module using outputs of the ANN based on the at least one feature vector;
        generate a meal plan for the at least one patient-entity node based on the plurality of meal recommendation parameters;
        continuously monitor the patient profile data to determine if at least one value of patient profile parameters deviates from a previous value of a patient profile parameter value by a margin exceeding a pre-set threshold value; and
        responsive to the at least one value of the patient profile parameters deviating from the previous value of the patient profile parameter by the margin exceeding the pre-set threshold value, generate an updated classifier feature vector and generate the meal plan based on the at least one meal plan recommendation parameter produced by the meal plan predictive model in response to the updated classifier feature vector.

2. The system of claim 1, wherein the patient profile data comprises video data and wherein the machine-readable instructions that when executed by the processor, cause the processor to:
    sample a plurality of frames from the video data;
    confirm that the patient profile is complete based on the sampled plurality of frames; and
    responsive to the confirmation, parse the video data to derive a plurality of key classifying features.

3. The system of claim 2, wherein the machine-readable instructions that when executed by the processor, cause the processor to execute a patient profile localization algorithm configured to:
    ingest a sampled image frame from the sampled plurality of frames;
    output a vector bounding box coordinates that enclose the patient profile; and
    generate a confidence score indicating a likelihood of the patient profile having a sufficient coverage for generation of the meal plan for the at least one patient-entity node based on the vector bounding box coordinates.

4. The system of claim 3, wherein the machine-readable instructions that when executed by the processor, cause the processor to, responsive to the confidence score being below a pre-set detection threshold, notify the at least one patient-entity node to request for additional video data related to the patient profile.

5. The system of claim 1, wherein the machine-readable instructions that when executed by the processor, cause the processor to retrieve remote historical patients-related data from at least one remote database based on the plurality of key classifying features, wherein the remote historical patients-related data is collected at other treatment sites or facilities of the same type.

6. The system of claim 5, wherein the machine-readable instructions that when executed by the processor, cause the processor to generate the at least one classifier feature vector based on the plurality of key classifying features and the local historical patients-related data combined with the remote historical patients-related data.

7. The system of claim 1, wherein the machine-readable instructions that when executed by the processor, further cause the processor to record the meal plan and at least one corresponding meal plan recommendation parameter along with the patient profile data on a permissioned blockchain ledger.

8. The system of claim 7, wherein the machine-readable instructions that when executed by the processor, further cause the processor to retrieve at least one meal plan recommendation parameter from the permissioned blockchain responsive to a request from at least one patient-entity node onboarded onto the permissioned blockchain.

9. The system of claim 7, wherein the machine-readable instructions that when executed by the processor, further cause the processor to execute a smart contract to generate at least one NFT including data corresponding to the meal plan on the permissioned blockchain.

10. The system of claim 1, wherein the machine-readable instructions that when executed by the processor, further cause the processor to compress the meal plan predictive model by pruning model's weights to remove the redundant ANN connections.

11. The system of claim 10, wherein the machine-readable instructions that when executed by the processor, further cause the processor to retrain the pruned meal plan predictive model to recover accuracy lost due to pruning.

12. The system of claim 1, wherein the machine-readable instructions that when executed by the processor, further cause the processor to confirm that the patient profile is complete based on a single digital image of the patient profile.

13. The system of claim 1, wherein the machine-readable instructions that when executed by the processor, further cause the processor to algorithmically generate a supplement formula comprising at least one key nutrient amount when the system fails to generate the meal plan based on the meal recommendation parameters.

14. A method for real-time generation of therapeutic meal plans based on predictive analytics of patient profile data, comprising:
    receiving, by a therapeutic plan server (TPS) node, the patient profile data from the at least one patient-entity node;
    parsing, by the TPS node, the patient profile data to derive a plurality of key classifying features;
    querying, by the TPS node, a local database to retrieve local historical patients-related data based on the plurality of key classifying features;
    generating, by the TPS node, at least one classifier feature vector based on the plurality of key classifying features and the local historical patients-related data;
    providing, by the TPS node, the at least one feature vector to the ML module coupled to an Artificial Neural Network (ANN);
    receiving, by the TPS node, a plurality of meal recommendation parameters from a meal plan predictive model generated by the ML module using outputs of the ANN based on the at least one feature vector;
    generating, by the TPS node, a meal plan for the at least one patient-entity node based on the plurality of meal recommendation parameters; and
    continuously monitoring the patient profile data to determine if at least one value of patient profile parameters deviates from a previous value of a patient profile parameter value by a margin exceeding a pre-set threshold value; and
    responsive to the at least one value of the patient profile parameters deviating from the previous value of the patient profile parameter by the margin exceeding the pre-set threshold value, generating an updated classifier feature vector and generating the meal plan based on the at least one meal plan recommendation parameter produced by the meal plan predictive model in response to the updated classifier feature vector.

15. A non-transitory computer-readable medium comprising instructions, that when read by a processor, cause the processor to perform:
    receiving the patient profile data from the at least one patient-entity node;
    parsing the patient profile data to derive a plurality of key classifying features;
    querying a local database to retrieve local historical patients-related data based on the plurality of key classifying features;
    generating at least one classifier feature vector based on the plurality of key classifying features and the local historical patients-related data;
    providing the at least one feature vector to the ML module coupled to an Artificial Neural Network (ANN);
    receiving a plurality of meal recommendation parameters from a meal plan predictive model generated by the ML module using outputs of the ANN based on the at least one feature vector;
    generating a meal plan for the at least one patient-entity node based on the plurality of meal recommendation parameters;
    continuously monitoring the patient profile data to determine if at least one value of patient profile parameters deviates from a previous value of a patient profile parameter value by a margin exceeding a pre-set threshold value; and
    responsive to the at least one value of the patient profile parameters deviating from the previous value of the patient profile parameter by the margin exceeding the pre-set threshold value, generating an updated classifier feature vector and generating the meal plan based on the at least one meal plan recommendation parameter produced by the meal plan predictive model in response to the updated classifier feature vector.

* * * * *